US007849768B2

(12) United States Patent
Klingels

(10) Patent No.: US 7,849,768 B2
(45) Date of Patent: Dec. 14, 2010

(54) APPARATUS AND METHOD FOR ROTARY MACHINING OF ROTORS

(75) Inventor: Hermann Klingels, Dachau (DE)

(73) Assignee: MTU Aero Engines GmbH, Munich (DE)

( * ) Notice: Subject to any disclaimer, the term of this patent is extended or adjusted under 35 U.S.C. 154(b) by 819 days.

(21) Appl. No.: 10/594,697

(22) PCT Filed: Mar. 24, 2005

(86) PCT No.: PCT/DE2005/000544

§ 371 (c)(1),
(2), (4) Date: Jul. 16, 2007

(87) PCT Pub. No.: WO2005/095032

PCT Pub. Date: Oct. 13, 2005

(65) Prior Publication Data

US 2008/0121077 A1    May 29, 2008

(30) Foreign Application Priority Data

Mar. 29, 2004    (DE) .................... 10 2004 015 300

(51) Int. Cl.
*B23B 3/00*      (2006.01)
*B23B 3/34*      (2006.01)
(52) U.S. Cl. .................................... 82/1.11; 82/129
(58) Field of Classification Search ............... 82/1.11, 82/1.2, 129; 408/180, 147; 29/889.21
See application file for complete search history.

(56) References Cited

U.S. PATENT DOCUMENTS

| 1,138,423 | A | * | 5/1915 | Swanberg | 82/171 |
| 3,744,357 | A | * | 7/1973 | Anderson et al. | 82/12 |
| 3,872,749 | A | * | 3/1975 | Plummer | 82/12 |
| 3,966,347 | A | * | 6/1976 | Watson | 408/180 |
| 4,369,007 | A | * | 1/1983 | Canady | 409/190 |
| 4,624,158 | A | * | 11/1986 | Keller | 82/12 |
| 4,750,392 | A | * | 6/1988 | Hong | 82/158 |

FOREIGN PATENT DOCUMENTS

GB    2 240 735 A    8/1991

* cited by examiner

*Primary Examiner*—Will Fridie, Jr.
(74) *Attorney, Agent, or Firm*—Crowell & Moring LLP

(57) ABSTRACT

An apparatus and method for machining of components, namely for rotary machining of rotationally symmetrical components on radially interior machining surfaces of a component, is disclosed. The device has a drill rod extending essentially axially and has a tool mount extending essentially radially, carrying a lathe tool. The drill rod has a projection that extends essentially radially and can be coupled to the tool mount that extends essentially radially, where the radial dimensions of the projection of the drill rod and of the tool mount are adapted to the dimensions of a hub bore of the component to be machined, such that the drill rod and the tool mount in the uncoupled state can be inserted into the hub bore, and, in the coupled state, the lathe tool mounted in the tool mount can be brought into contact with the radially interior machining surfaces of the component.

15 Claims, 6 Drawing Sheets

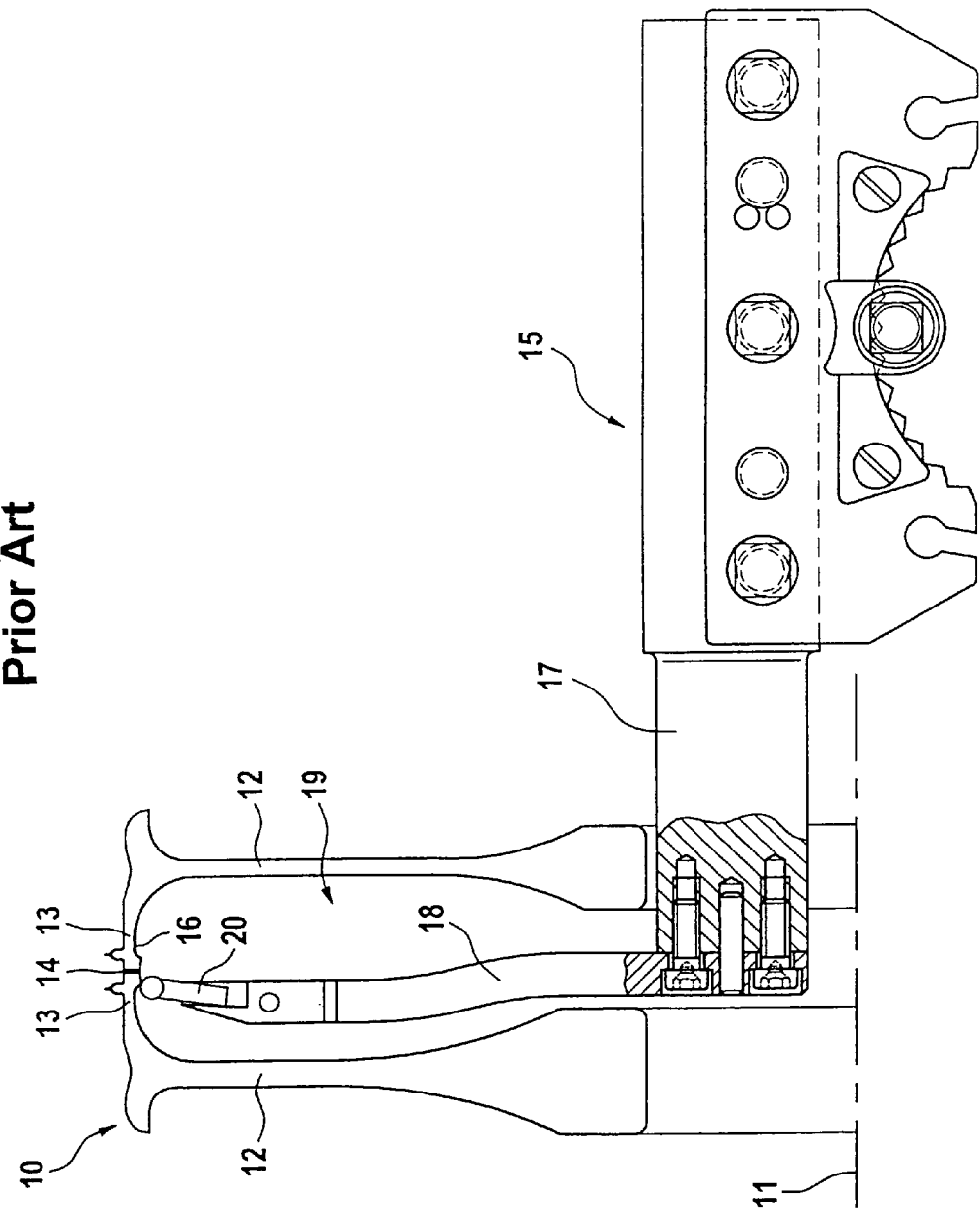

APPARATUS AND METHOD FOR ROTARY MACHINING OF ROTORS

BACKGROUND AND SUMMARY OF THE INVENTION

This application claims the priority of International Application No. PCT/DE2005/000544, filed Mar. 24, 2005, and German Patent Document No. 10 2004 015 300.0, filed Mar. 29, 2004, the disclosures of which are expressly incorporated by reference herein.

The invention relates to a device for rotary machining of rotors on machining surfaces facing radially inward.

GB-A-2 240 735 discloses a device for rotary machining of stators of gas turbine engines, the device being provided in particular for machining a shroud liner on the fan housing. This device is designed as a portable machining station having an arm (26) that extends radially, can be coupled to the low-pressure shaft of the engine and can be driven by an electric motor, the lathe tool sitting on the radially outer end of the arm. The lathe tool/cutting tool is arranged so it is adjustable, i.e., movable axially and radially in relation to the arm (26) on carriage-like mounts (48, 60). During the axial feed movement, the radial position is preferably controlled via a rocker cam (88), so that the proper contour of the shroud liner is "automatically" obtained, this contour being essentially in the form of a circular cylinder with minor variations in diameter. The advantage of this device may be regarded as the fact that large, sensitive modular units such as engines can be machined in their proper installed position, taking into account the loads and deformation stresses occurring in this position, so that better dimensional stability during operation can be achieved. The coupling and startup of operation of the device require relatively large inside cross-sections that are open at one end axially, such as a fan housing that is open at the front without any undercuts and/or other constrictions. This device is not suitable for inside machining of rotors composed of several disks having deep undercuts and/or chambers.

Rotors of gas turbines, especially rotors of high-pressure compressors of aircraft engines, are usually formed by several rotor disks arranged axially in succession, whereby the rotor disks are either bolted together or welded together. If the rotor disks are welded, welds formed on radially interior surfaces and radially exterior surfaces must be reworked to prevent notching. Since it is difficult to gain access to the radially interior surfaces of rotors, machining of welds on radially interior surfaces is more problematic than machining of welds on radially exterior surfaces.

In the course of the optimization of gas turbines, especially optimization of aircraft engines, higher and higher rotational speeds of the rotors are necessary. The load to be sustained by the rotors is also increased. As a rule, the hub bores inside the rotors are smaller, the higher the load on the rotors. It follows from this that the radial depth of chambers arranged between interconnected rotor disks increases. For example, if the radial depth of the chambers arranged between the interconnected rotor disks is greater than the diameter of the hub bore, special devices and/or tools are necessary for machining, namely for rotary machining, of the radially interior machining surfaces extending between the interconnected rotor disks.

Referring to prior art, devices and/or tools for rotary machining of rotors on radially interior machining surfaces taking into account the problems outlined above have been known. However, the devices and/or tools for rotary machining known from prior art are no longer suitable in particular if the width of the rotor disks in the hub area increases in addition to the progressively increasing radial depth of the chambers located between interconnected rotor disks, i.e., if the axial distance between two rotor disks is reduced in the hub area. In this case, it is impossible to insert the devices and/or tools known from prior art for rotary machining into the rotors to be machined and/or to perform any rotary machining on the radially interior machining surfaces of the rotor.

Against this background, the object of the present invention is to create a novel device for the machining of components.

According to this invention, the drill rod has a projection extending essentially radially, this projection being connectable with the tool mount extending essentially radially, whereby the radial dimensions of the projection on the bore rod and the tool mount are adapted to the dimensions of a hub bore of the component to be machined such that the drill rod and the tool mount can be inserted in the uncoupled state into the hub bore and in the coupled state the lathe tool mounted in the tool mount can be brought up to the radially interior machining surface of the component.

The lathe tool, together with its holder, can be pivoted primarily in the axial direction, for which purpose a drive shaft is installed in the drill rod and a gear is installed in the projection of the drill rod and in the tool mount.

The present invention provides a device for rotary machining of rotors on the radially interior machining surface of the rotors, the device even permitting reliable and secure machining of the radially interior machining surfaces of the rotors if, on the one hand, the diameter of the hub bores in the rotors to be machined is smaller and thus the radial extent of chambers located between two rotor disks inside the rotors to be machined is greater and if, on the other hand, the axial distance in the hub area, in particular between neighboring rotor disks which border chambers extending essentially in the radial direction, becomes smaller.

Preferred developments of the present invention are provided in the following description.

BRIEF DESCRIPTION OF THE DRAWINGS

Exemplary embodiments of the invention are explained in greater detail below on the basis of the drawings without being limited thereto.

FIG. 6 is a schematic illustration of a device according to the prior art for rotary machining of rotationally symmetrical components on radially interior machining surfaces of the components in a sectional view.

DETAILED DESCRIPTION OF THE DRAWINGS

Figure 1:
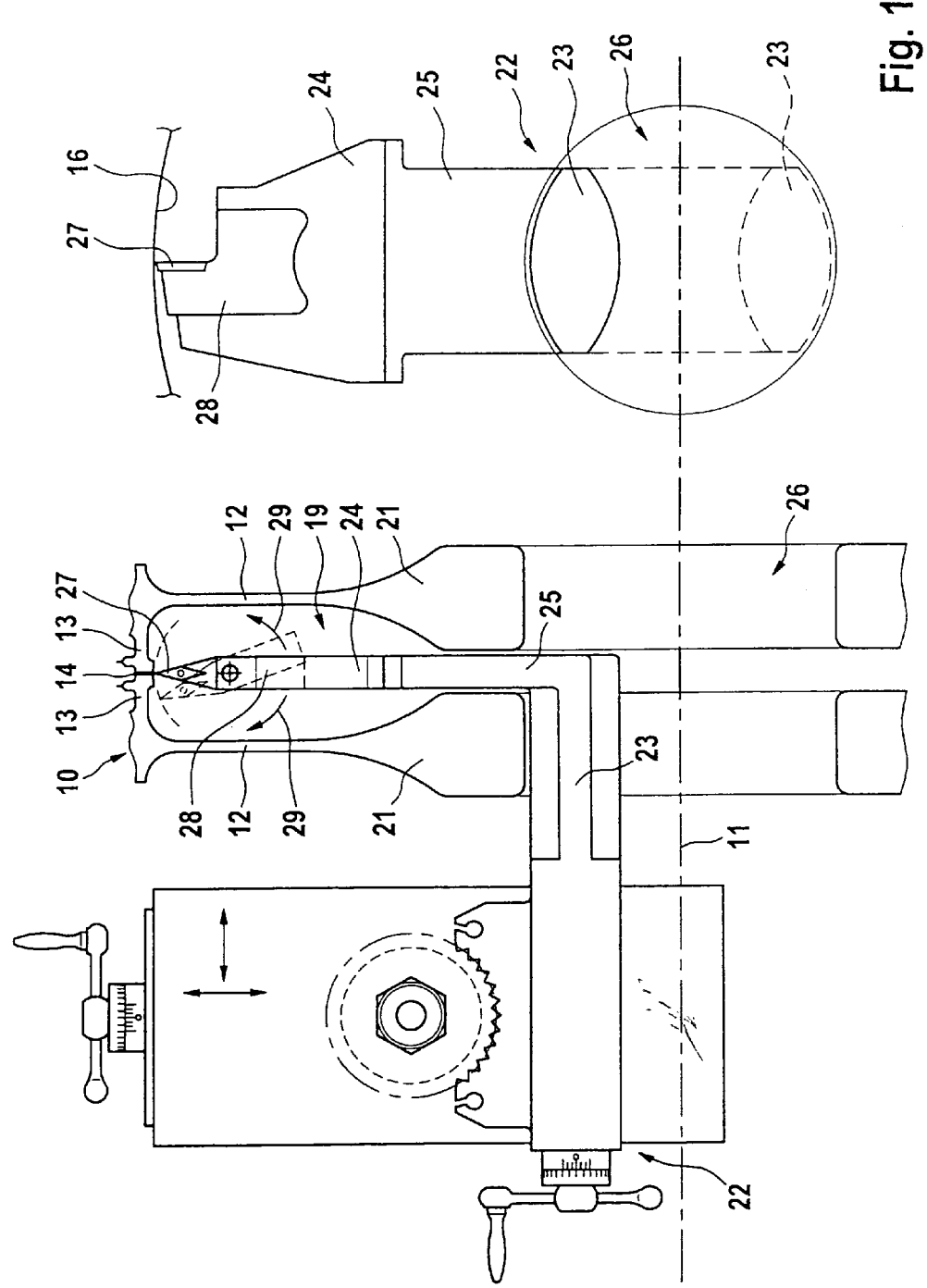
FIG. 1 is a schematic illustration of an inventive device for rotary machining of rotors on radially interior machining surfaces of the components, in plan view and in side view.

The present invention is described in greater detail below with reference to FIGS. 1 through 5. First, however, referring to FIG. 6, a device for rotary machining of rotationally symmetrical components on radially interior machining surfaces of same that is known from prior art is to be described.

FIG. 6 shows a cross-section through a rotor 10, e.g., for a high-pressure compressor of an aircraft engine. An axial axis of symmetry of the rotor 10 is labeled with reference numeral 11. The rotor 10 in FIG. 6 is formed by several rotor disks 12 arranged axially in succession, but only two such rotor disks 12 are shown in FIG. 6. The rotor disks 12 extend essentially in the radial direction, with two neighboring rotor disks 12 being joined together on radially exterior ends via projections 13 that extend axially. In the example shown in FIG. 6, the rotor disks 12 are joined by a weld 14 on the projections 13. To prevent notching, which causes a decline in strength, the rotor disks 12 welded together to the rotor 10 are reworked in the area of the welds 14. The device 15 shown in FIG. 6 for rotary machining is suitable for machining of the welds 14 on the radially interior machining surfaces 16 of the rotor 10.

The device 15 according to prior art has a drill rod 17 that extends essentially axially and a tool mount 18 that extends essentially radially. As FIG. 6 shows, the drill rod 17 of the device 15 is inserted into the hub bore of the rotor 10, but the tool mount 18 extends in the area of a chamber 19 formed between two rotor disks 12 that are joined together. A lathe tool 20 held in the tool mount 18 comes into abutment with the radially interior machining surface 16 in the area of the projections 13 and ultimately is used for reworking the weld 14 on the radially interior machining surface 16. To do so, the rotor 10 is set in rotation, and the tool mount 18 and the lathe tool 20 are acted upon with a radial advance via the drill rod 17.

The device 15 known from prior art for rotary machining of the rotor 10 on the radially interior machining surfaces 16 as shown in FIG. 6 is no longer suitable for reworking the weld 14 in the area of the radially interior machining surfaces 16 if, as shown in FIG. 1, a hub area 21 of the rotor disks 12 of the rotor 10 becomes progressively thicker and thus the axial distance between two rotor disks 12 that are to be joined together in the hub area 21 is decreased. In this case, the device 15 shown in FIG. 6, which is known from the state of the art, namely the tool mount 18 of same rotor disks 12, can no longer be inserted into the chamber 19 between two interconnected rotor disks 12; on the other hand, due to the reduced axial spacing in the hub area 21 between two interconnected rotor disks 12, the device 15 according to prior art cannot provide an adequate axial advance for rotary machining.

Referring to FIGS. 1 through 5, an inventive device 22 for rotary machining is described below, the device even permitting rotary machining of rotationally symmetrical components, in particular of rotors 10, when the geometric ratios of the rotor to be machined as described above and as shown in FIG. 1 prevail.

Figure 2:
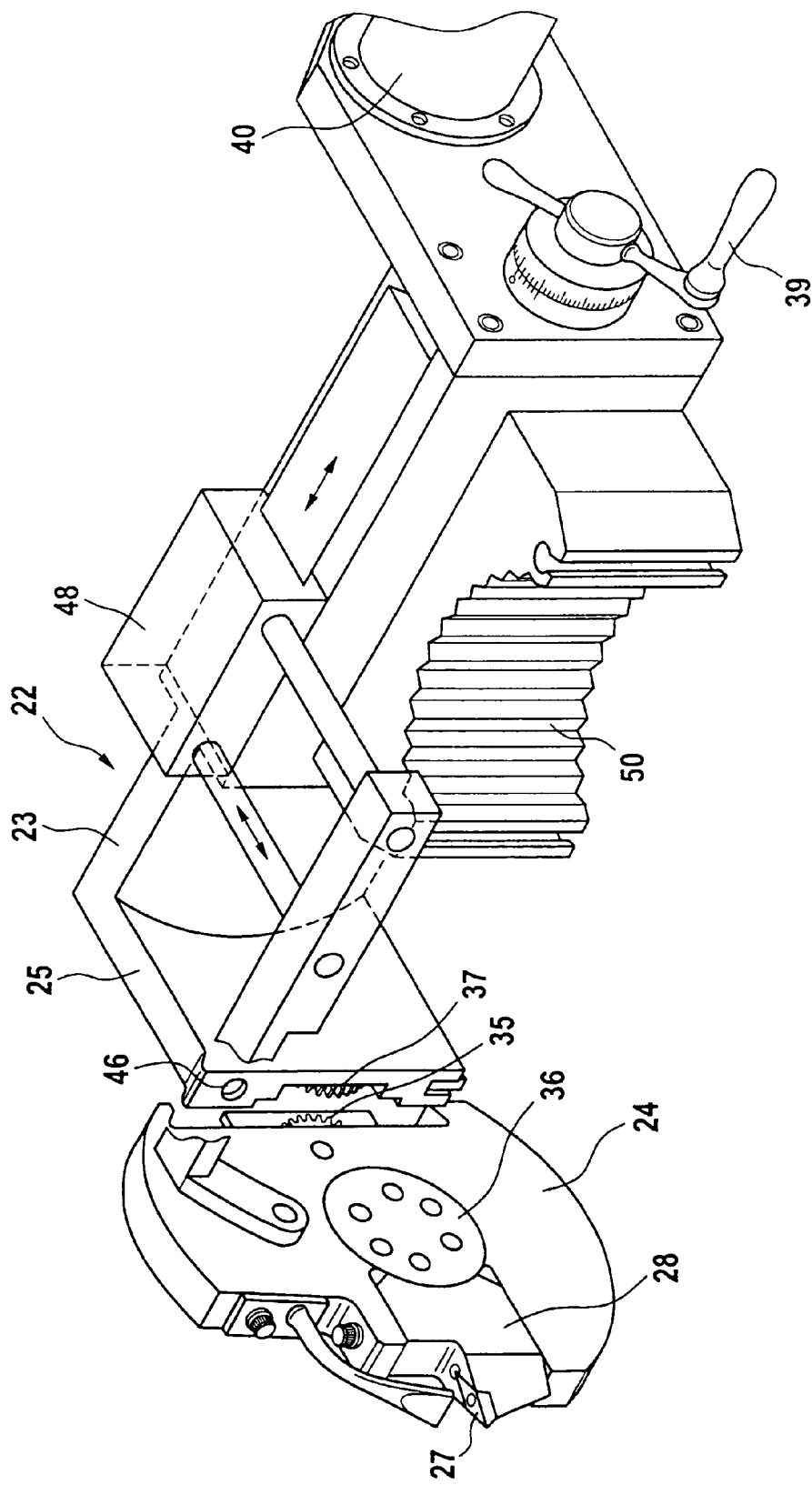
FIG. 2 illustrates the inventive device according to FIG. 1, in perspective view.

The inventive device 22 for rotary machining of rotationally symmetrical components on radially interior machining surfaces of the components has a drill rod 23 extending essentially axially and has a tool mount 24 extending essentially radially. The drill rod 23 extending essentially axially has a projection 25 extending essentially radially. The tool mount 24 can be affixed to the projection 25 on the drill rod 23. FIG. 1 shows a state of the inventive device 22, in which the tool mount 24 is attached to the projection 25 on the drill rod 23. FIG. 2, in contrast, shows a diagram in which the tool mount 24 is uncoupled from the projection 25 on the drill rod 23.

Figure 3:
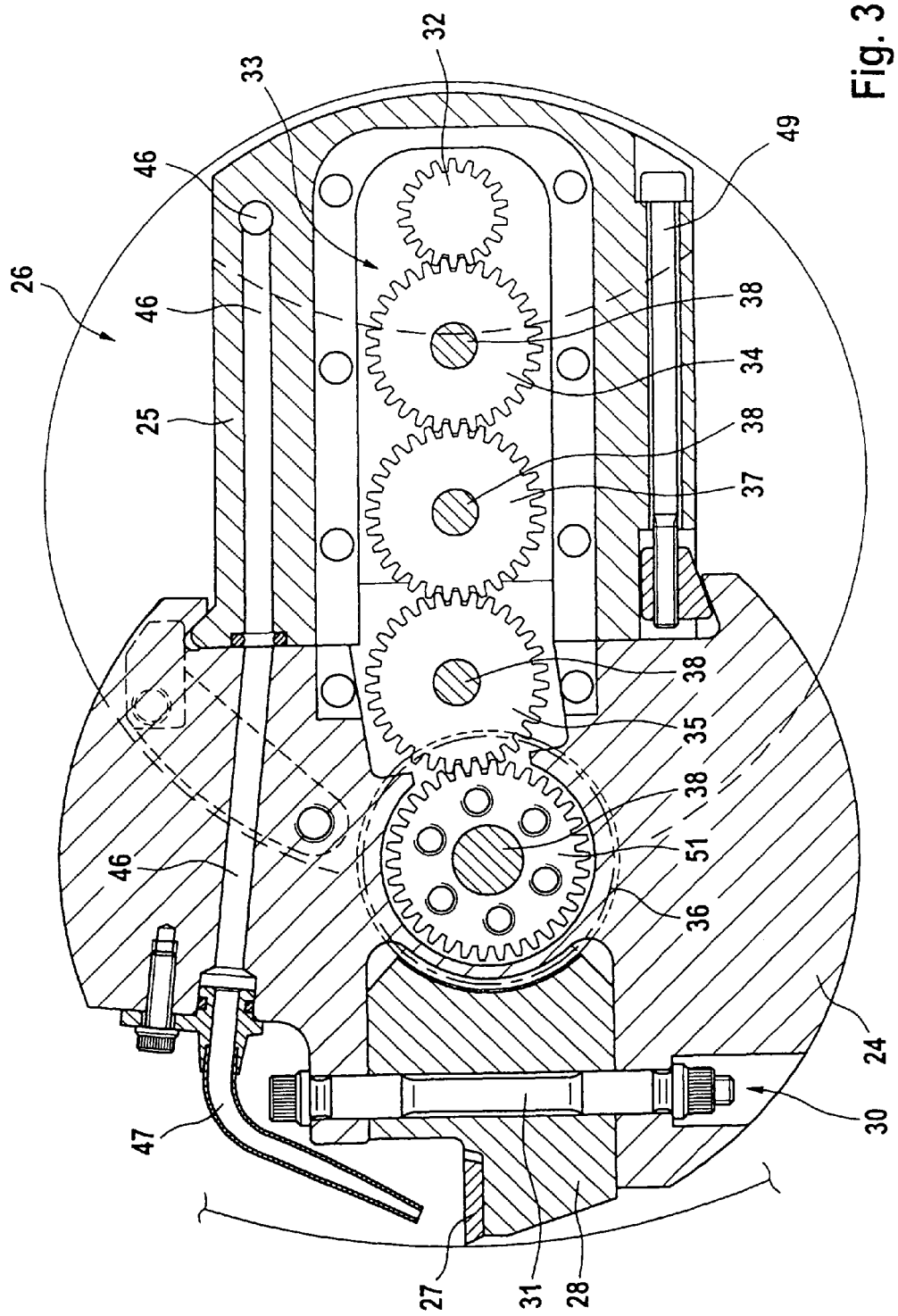
FIG. 3 is a detail of the inventive device according to FIG. 1.
Figure 4:
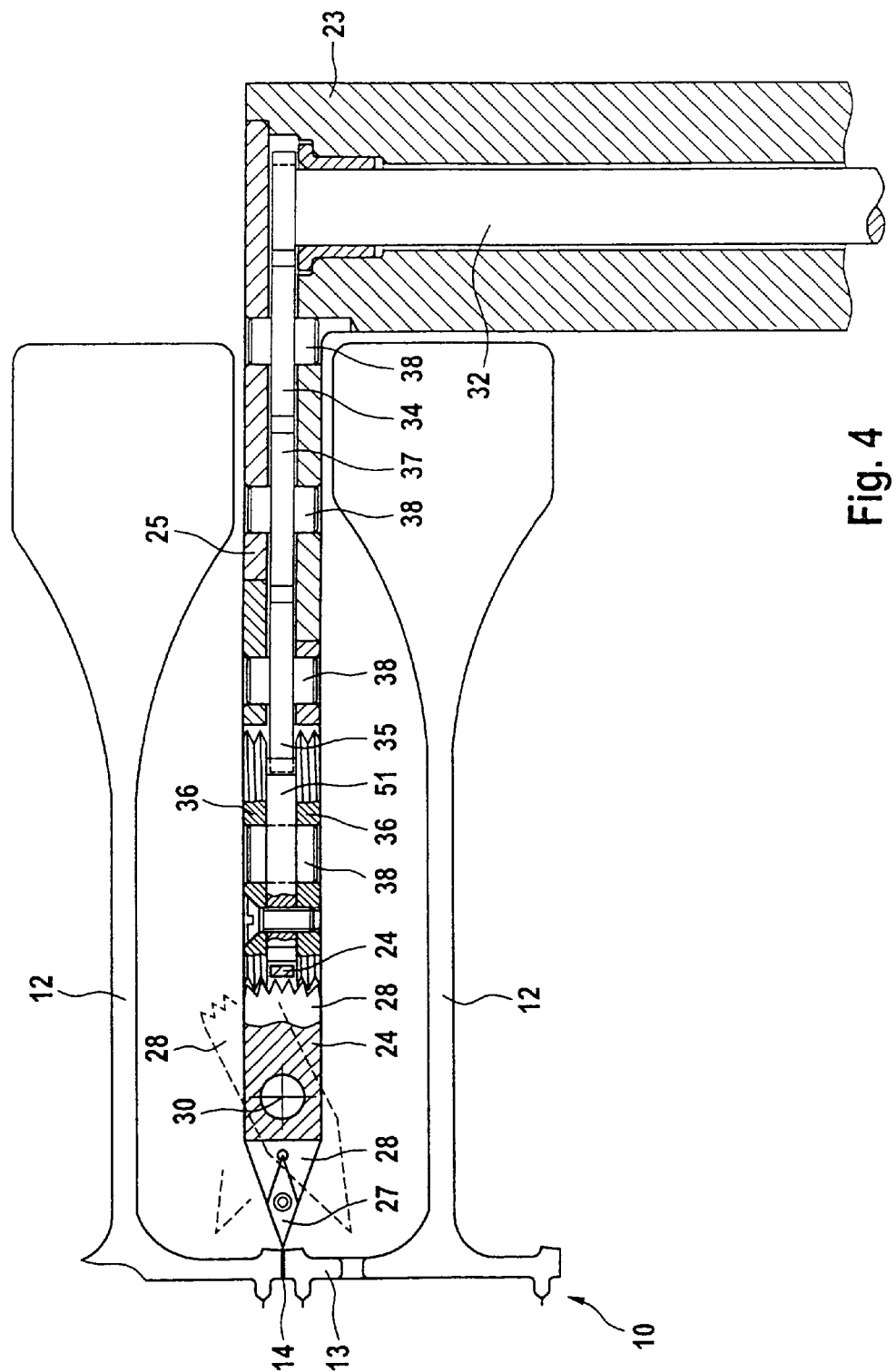
FIG. 4 is another detail of the inventive device according to FIG. 1.

The radial dimensions of the projection 25 and/or the drill rod 23 and the radial dimensions of the tool mount 24 are adapted to the dimensions of a hub bore 26 of the rotor 10 to be machined such that the drill rods 23 and the tool mount 24 can be inserted into the hub bore 26 in an uncoupled and/or disassembled state. One outside diameter of the tool mount 24 and of the drill rod 23, in particular the outside diameter of the projection 25 of same, is preferably smaller than one inside diameter of the hub bore 26. The tool mount 24 and the drill rod 23 may thus be inserted axially into the hub bore 26 of the rotor 10 to be machined, without the outside edges of the tool mount 24 and the drill rod 23 colliding with the inside edges of the rotor 10 to be machined. As shown in FIG. 3 in particular, the lathe tool 27 is set back radially with respect to an envelope of the tool mount 24. This makes it possible to reliably prevent damage to the rotor, in particular the rotor disks 12, on insertion of the inventive device 22 into the hub bore 26 of the rotor 10. In the assembled state, i.e., coupled state of the tool mount 24 and the projection 25 of the drill rod 23, a lathe tool 27 mounted in the tool mount 24 can be brought into contact with the radially interior machining surface 16 of the rotor 10 (see FIG. 1).

As shown in FIGS. 2 and 3 in particular, the lathe tool 27, preferably designed as a rotary chisel, is mounted in the tool mount 24 by way of a lathe tool holder 28. The tool holder 28 can be pivoted with respect to the tool mount 24. The pivotability of the lathe tool holder 28 with respect to the tool mount 24 is illustrated by arrows in FIG. 1. The lathe tool 27 can be pivoted together with the lathe tool holder 28 with respect to the tool mount 24 and namely, in the sense of FIG. 1 with a primarily axial component. As shown best in FIG. 3, the lathe tool holder 28 is therefore mounted on the tool mount 24 via a rotary joint 30. The rotary joint 30 is formed by a bore inside the lathe tool holder 28 and by the tool mount 24 into which a bolt and/or a swiveling articulated pin 31 is inserted.

The pivoting movement of the lathe tool holder 28 with respect to the tool mount 24 is provided via a drive shaft 32 guided in the drill rod 23, whereby the drive shaft 32 is coupled to the lathe tool holder 28 via a gear 33. The gear 33 converts the drive movement, namely the rotational movement of the drive shaft 32 into a swiveling movement of the lathe tool holder 28.

In the exemplary embodiment shown here, the gear 33 is formed by several gearwheels arranged in the projection 25 of the drill rod 23. A first gearwheel 34 is operatively engaged with the drive shaft 32 and a second gearwheel 35 is operatively engaged with a gearwheel 51, which is coupled to a worm gear 36, whereby the worm gear 36 is part of the gear 33 and is positioned in the tool mount 24. Referring to the exemplary embodiment of FIG. 3, another gearwheel 37 is connected between the first gearwheel 34, which is in contact with the drive shaft 32, and the second gearwheel 35, which is in contact with the gearwheel 51 of the worm gear 36. The rotational movement of the drive shaft 32 is thus transmitted via the gearwheels 34, 35, 37 and 51 to the worm gear 36, which is in operative connection with the lathe tool holder 28 and thus converts the rotational movement of the drive shaft 32 into a pivoting movement of the lathe tool holder 28. The gearwheels 34, 35, 37 and 51 and the worm gear 36 are mounted in the projection 25 of the drill rod 23 and/or in the tool mount 24 via corresponding bearing shafts 38. The lathe tool holder 28 is designed as a segment of a worm gear.

Figure 5:
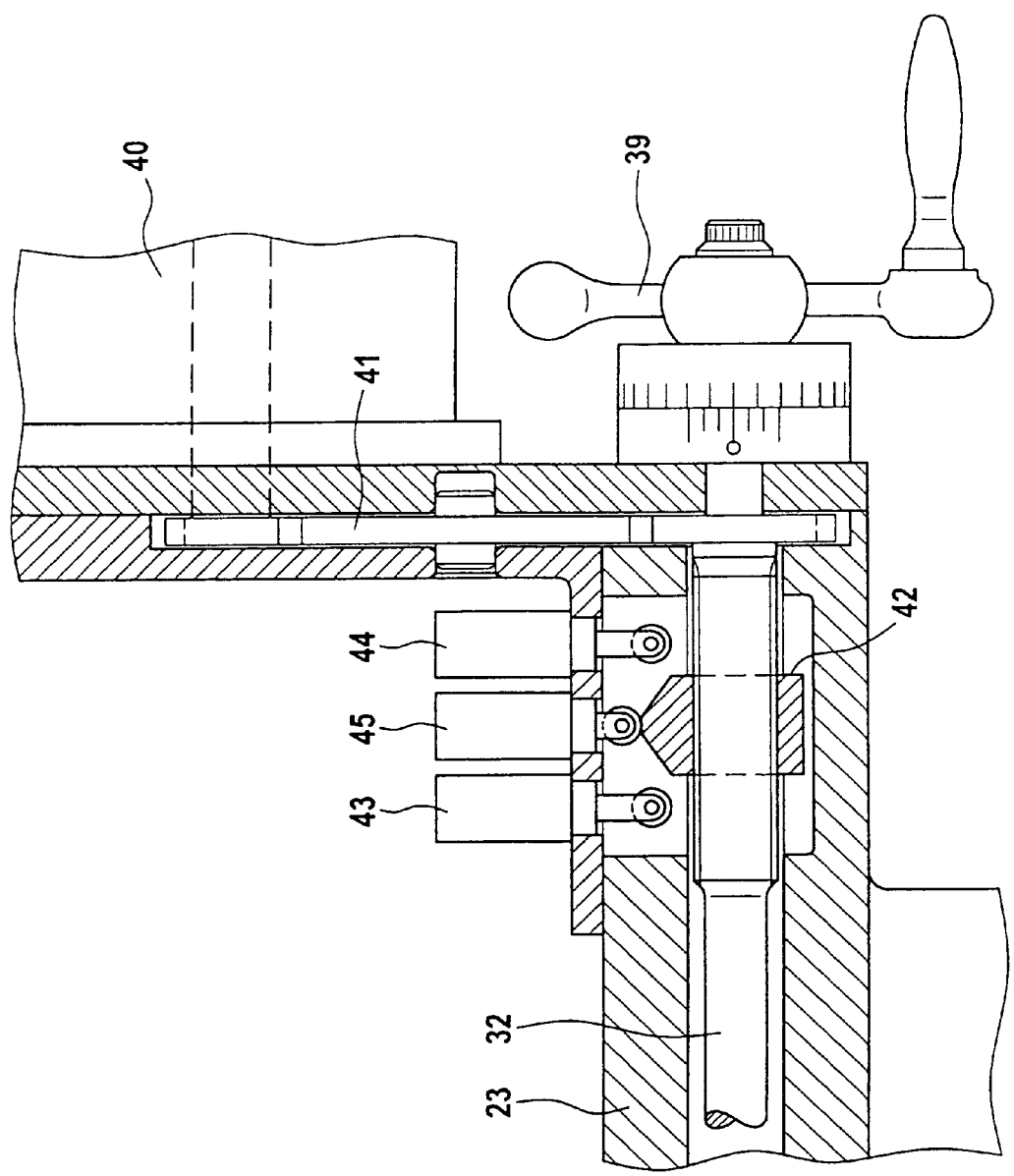
FIG. 5 is another detail of the inventive device according to FIG. 1.

The drive power for driving the drive shaft 32 and thus ultimately the drive power for pivoting the lathe tool holder 28 are supplied either manually via a crank 39 or by an electric motor drive 40. The crank 39 and the electric motor drive 40 are depicted in FIGS. 2 and 5. The crank 39 acts directly on the drive shaft 32. A gear 41 is connected between the electric motor drive 40 and the drive shaft 32. FIG. 5 shows a mechanical stop 42 that cooperates with the drive shaft 32, whereby the mechanical stop 42, together with the limit switches 43 and 44, limits the movement of the lathe tool holder 28 and thus the lathe tool 27, namely, the pivoting movement of same. Between the two limit switches 43 and 44, there is a switch 45 which serves to indicate the position of the lathe tool holder 28 and thus the lathe tool 27.

FIG. 3 shows lines 46 that are integrated into the drill rod 23, into the extension and/or the projection 25 on the drill rod 23 and into the tool mount 24 to carry coolant and/or lubricant, for example, in the direction of the lathe tool 27. The coolant and/or lubricant carried through the lines 46 is directed at the lathe tool 27 through a nozzle 47.

As already mentioned, the dimensions of the tool mount 24 and the projection 25 on the drill rod 23 are such that the tool mount 24 and the drill rod 23 in the disassembled and/or uncoupled state can be inserted into the hub bore 26 of the rotor 10 to be machined. With the help of the assembly device 48 illustrated in FIG. 2, the tool mount 24 is first inserted into the hub bore 26 of the rotor 10 to be machined and is then axially shifted to the position inside the hub bore 26 and/or the rotor 10, where rotary machining is to be performed on radially interior surfaces of the rotor 10. In this axial position, the tool mount 24, together with the assembly device 48, is pushed radially outward between two neighboring rotor disks 12 of the rotor 10, i.e., into the chamber 19 between two neighboring rotor disks 12. Then the drill rod 23, together with the projection and/or projection 25, is pushed axially into the hub bore 26 of the rotor 10 to be machined until the projection 25 is in alignment with the tool mount 24. In this position, the tool mount 24 and the projection 25 of the drill rod 23 are joined together. This may be accomplished, for example, with the help of the clamping device 49 shown in FIG. 3. Alternatively, the tool mount 24 and the projection 25 of the drill rod 23 may also be coupled together by a screw connection.

As shown in FIG. 2 in particular, the inventive device 22 can be mounted to a machining station, namely to a tool carriage of a lathe via a quick-change mount 50. The quick-change mount 50 is thus an integral component of the drill rod 23.

With the inventive device, a rotary machining of a rotor on radially interior machining surfaces of the rotor is possible even when a hub bore of the rotor has a small radial extent in comparison with chambers that are connected on the outside radially to the hub bore and are bordered by two neighboring rotor disks. In addition, the inventive device is suitable for rotary machining of rotors when the axial distance between the rotor disks is minimal in the hub area of the rotor disks. The rotary machining of the rotor may also take place via the swiveling movement of the lathe tool when the small axial distance between two rotor disks does not allow an adequate axial advance of the drill rod. The pivoting movement of the lathe tool compensates for the lack of axial advance of the drill rod.

The invention claimed is:

1. A device for rotary machining of rotors, in particular rotors of gas turbines, on machining surfaces facing radially inward, wherein a rotor has at least two rotor disks which are in close proximity axially and have thick hub areas axially and central hub bores and are connected on an outside radially via projections, with a drill rod extending essentially in an axial direction and being held in a rotationally fixed manner and a tool mount holding a lathe tool and extending essentially radially, wherein the drill rod has a projection extending essentially radially and coupleable to the tool mount extending essentially radially, wherein radial dimensions of the projection of the drill rod and of the tool mount are adapted to a dimension of a hub bore of the rotor to be machined, such that the drill rod and the tool mount are insertable in an uncoupled state into the hub bore, and wherein, in a coupled state, the lathe tool mounted in the tool mount is abutable with a machining surface of the rotor facing radially inward, and wherein the lathe tool is movably mounted in the tool mount via a lathe tool holder, wherein the lathe tool is pivotable primarily axially together with the lathe tool holder with respect to the tool mount, and wherein a drive shaft is guided in the drill rod, and wherein the drive shaft is coupled to the lathe tool holder via a gear, wherein the gear converts a driving movement of the drive shaft into a pivoting movement of the lathe tool holder.

2. The device according to claim 1, wherein the gear is formed by at least one gearwheel extending in the projection of the drill rod and by a worm gear extending in the tool mount and having a gearwheel allocated to the worm gear.

3. The device according to claim 2, wherein several gearwheels are located in the projection of the drill rod, wherein a first gearwheel is coupled to the drive shaft and a second gearwheel is coupled to the gearwheel allocated to the worm gear.

4. The device according to claim 2, wherein the worm gear acts on the lathe tool holder, wherein the lathe tool holder is designed as a segment of the worm gear.

5. The device according to claim 1, wherein a line is integrated into the drill rod and into the tool mount, wherein the line carries a coolant and/or a lubricant in a direction of the lathe tool.

6. An apparatus for rotary machining of a rotor, comprising:
a drill rod extending in an axial direction and being held in a rotationally fixed manner and including a projection coupled to the drill rod and extending in a radial direction;
a tool mount coupleable to the projection;
a lathe tool extending in the radial direction and coupled to the tool mount, wherein the lathe tool is pivotably moveable on the tool mount in the axial direction; and
a drive mechanism, wherein the drive mechanism pivotably moves the lathe tool.

7. The apparatus according to claim 6, wherein the lathe tool is fixedly mounted in a lathe tool holder and wherein the lathe tool holder is pivotably mounted in the tool mount.

8. The apparatus according to claim 7, further comprising a drive shaft disposed within the drill rod, wherein the drive shaft is coupled to the lathe tool holder via a gear, and wherein the gear converts a rotation of the drive shaft into a pivoting movement of the lathe tool holder.

9. The apparatus according to claim 6, wherein the drive mechanism is a manually driven crank.

10. The apparatus according to claim 6, wherein the drive mechanism is an electric motor.

11. A method of rotary machining of a rotor, comprising the steps of:
inserting a lathe tool into a chamber defined between two rotor disks of the rotor, the lathe tool extending radially with respect to the two rotor disks;
engaging the lathe tool with a radially internal weld between the two rotor disks;
holding the lathe tool rotationally stationary; and
pivotably moving the lathe tool in an axial direction to machine the weld.

12. The method according to claim 11, further comprising the steps of:
   inserting a drill rod into the rotor; and
   coupling a tool mount to the drill rod within the rotor, wherein the lathe tool is disposed on the tool mount.

13. The method according to claim 11, further comprising the step of rotating a drive shaft to pivotably move the lathe tool.

14. The method according to claim 11, further comprising the step of rotating the rotor.

15. The method according to claim 12, further comprising the step of holding the drill rod axially stationary during a machining process.

* * * * *